United States Patent [19]
Huillet et al.

[11] Patent Number: 5,903,446
[45] Date of Patent: May 11, 1999

[54] DIRECT CURRENT VOLTAGE CONVERTER WITH SOFT SWITCHING

[75] Inventors: Henri Huillet, Merignac; Didier Ploquin, Martignas, both of France

[73] Assignee: Gaia Converter, Merignac, France

[21] Appl. No.: 09/029,753

[22] PCT Filed: Aug. 29, 1996

[86] PCT No.: PCT/FR96/01330

§ 371 Date: May 7, 1998

§ 102(e) Date: May 7, 1998

[87] PCT Pub. No.: WO97/08812

PCT Pub. Date: Mar. 6, 1997

[30] Foreign Application Priority Data

Aug. 30, 1995 [FR] France .................................. 95 10362

[51] Int. Cl.[6] .................................................. H02M 3/335
[52] U.S. Cl. .................................................. 363/17; 363/21
[58] Field of Search ............................... 363/17, 21, 25, 363/97

[56] References Cited

U.S. PATENT DOCUMENTS

| | | | |
|---|---|---|---|
| 4,720,668 | 1/1988 | Lee et al. ............................. | 323/271 |
| 4,823,249 | 4/1989 | Garcia, II ............................. | 363/24 |
| 5,177,675 | 1/1993 | Archer ................................. | 363/25 |
| 5,262,930 | 11/1993 | Hua et al. ............................. | 363/21 |
| 5,434,767 | 7/1995 | Bararseh et al. ...................... | 363/16 |
| 5,729,444 | 3/1998 | Perol .................................. | 363/25 |

*Primary Examiner*—Stuart N. Hecker
*Attorney, Agent, or Firm*—Young & Thompson

[57] ABSTRACT

The invention relates to a continuous voltage converter with soft switching, comprising a transformer (Np, Ns) whose primary is particularly of the type with a half-bridge mounting and is adapted to be connected to a source of input voltage (Ve) by means of two electronic switches (INT1, INT2) and whose secondary, of the mono-alternating type, is adapted to be connected to a load by means of an inductance in series (L2) and means (1 to 3, G1, G2) to control alternatingly the two switches, at fixed frequency, according to a regulation by modification of the pulse width as a function of the output voltage (Vo), so as to provide to said primary a switching at zero voltage, said converter being characterized in that said secondary comprises moreover a resonant circuit (L1, C1) so as to provide for said secondary a quasi-resonant switching at zero current.

4 Claims, 9 Drawing Sheets

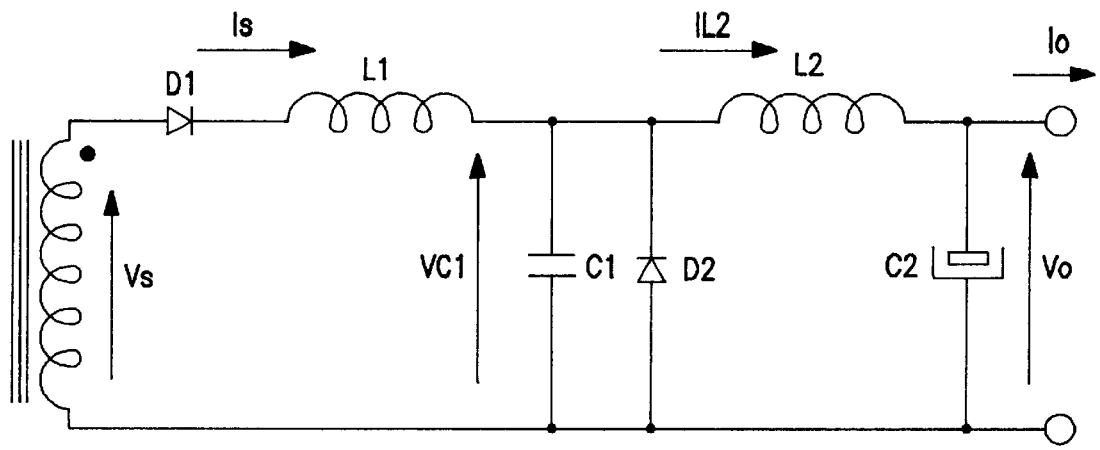
FIG. 5
PRIOR ART
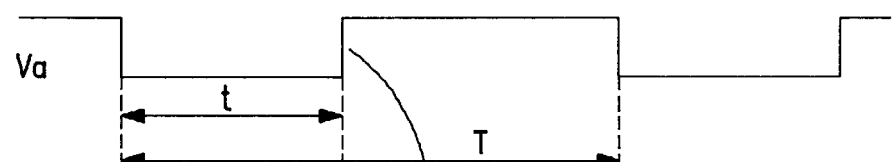
FIG. 7A   Va
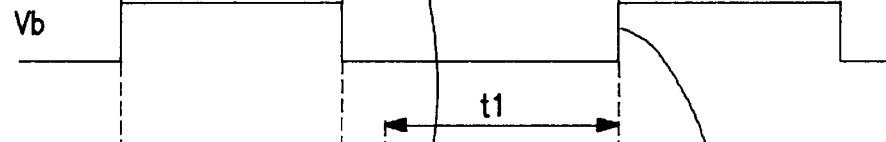
FIG. 7B   Vb
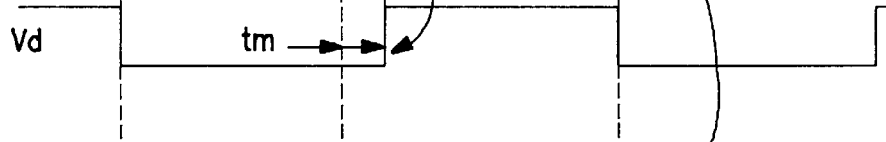
FIG. 7C   Vd
FIG. 7D   Vc

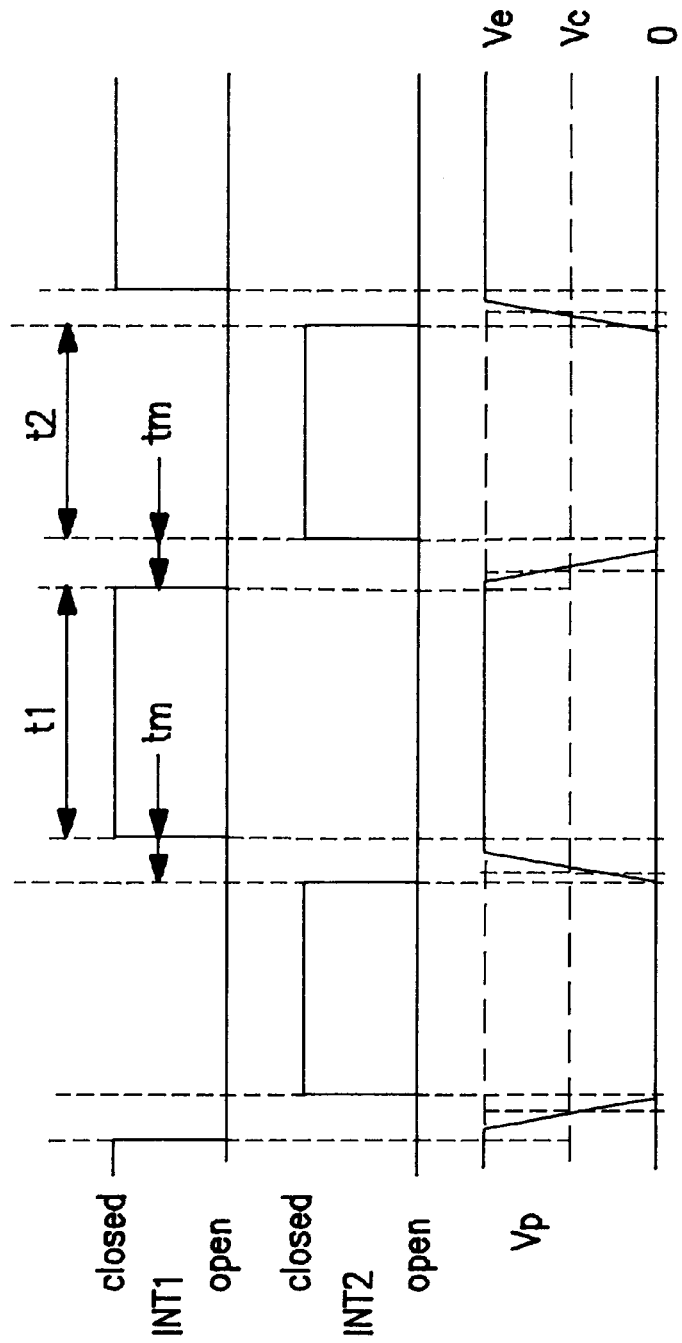

DIRECT CURRENT VOLTAGE CONVERTER WITH SOFT SWITCHING

The present invention relates to the conversion of electrical energy and more particularly the creation, from a continuous input voltage, of several continuous output voltages and deals generally with assuring the most perfect possible regulation of the outlet voltage or voltages relative, on the one hand, to variations of input voltage, and, on the other hand, variations of the output current or currents absorbs by the load or loads, and this with the highest efficiency possible.

Various techniques have been used until now, so as to ensure such a regulation.

The first types of voltage converters were with a linear regulator thermally dissipating the excess energy between the requirements of the load and the supply capacities. Such converters are bulky and of low efficiency, of the order of 50%.

Then there appeared chopper converters with forced switching in which the transfer of energy just necessary, from the input to the output or outputs, takes place by energy quanta drawn in a period manner from the source, stored in reactive components, then restituted toward the load or loads by so-called chopping techniques using switching with electronic switches.

The principal drawback of these converters arises from the fact that each switching is accompanied by losses which increase with the number of switchings, which is to say the frequency of chopping.

However, with the development of the characteristics of the components, it has been able to reach an optimum with the type of converter with apparatuses functioning at chopping frequencies of the order of 200 KHz with an efficiency that can reach 80%.

These converters have been recently supplanted by devices using resonance chopping techniques whose principle is to use, even to amplify, the effects of the parasitic elements by addition of passive components forming resonant circuits. These structures thus permit creating conditions under which the voltages at the terminals of the switches or switching diodes, or the current which passes through them, are zero at the moments at which their switching is ordered. The switching losses are corresponding reduced.

This is permitted raising the chopping frequency, which exceeded 500 KHz, whilst correspondingly reducing the weight and volume of the converter.

Such techniques nevertheless remain difficult to use and have drawbacks and limits.

Upon each switching there arise strong currents or overvoltages in the resonance circuits and hence losses by conduction. If the switching losses are reduced, the conduction losses conversely are increased.

Moreover, this drawback has required overdimensioning the chopping components relative to conventional supply, by a factor of 1.5 to 2.

Still more recently there have appeared new conversion techniques with a chopping regulator with soft switching. They are distinguished from the resonance techniques by the absence of a resonant circuit which is costly as to loss by conduction and by switching conditions at zero voltage, hence with less loss per switching, obtained from elements of conventional chopping techniques.

These new techniques are for example disclosed in U.S. Pat. Nos. 4,441,146, 5,057,986, and 5,126,931, as well as in the publications:

"Utilization of an Active-Clamp Circuit to Achieve Soft Switching in Flyback Converters" of R. Watson, F. C. Lee, G. C. Hua; PESC Conference, 1994;

"Characterization of an Active Clamp Flyback Topology for Power Factor Correction Applications" of R. Watson, F. C. Lee, G. C. Hua; PESC Conference, 1994.

However, the effectiveness of these techniques remains limited as to the range of variation of the input voltage, which is insufficient in most industrial applications. Thus, for large variations of this input voltage the conditions for soft switching are no longer present and to restore these conditions one must have recourse to arrangements, particularly resonant circuits, which give rise to serious problems of loss by conduction.

The present invention particularly provides, so as to adapt these soft switching techniques to a wider range of input voltages, to restore said soft switching conditions but by simpler means reducing the conduction losses, as well as the cost and the size of the converter.

To this end, the invention has for its object a continuous voltage converter with soft switching, comprising a transformer whose primary is particularly of the type with half bridge mounting and is adapted to be connected to an input voltage source by means of two electronic switches and whose secondary, of the mono-alternating type, is adapted to be connected to a load by means of an inductance in series and means to control alternatingly the two switches, with fixed frequency, according to a regulation by modulation of the impulse width as a function of the output voltage, so as to provide to the primary a switching at zero voltage, said converter being characterized in that said secondary comprises moreover a resonance circuit, without free-wheel diode, such as to provide to the secondary a quasi-resonant switching at zero current.

According to one embodiment, the secondary circuit comprises moreover a filtering-rectifying circuit of conventional type, a resonant circuit comprising a condenser and a low value inductance, said resonant circuit being adapted to create in the secondary winding of the transformer, at each opening/closing cycle of the switches, a current of sinusoidal shape which is zero or passes through a zero value in time intervals during which the two switches are both open, such that the current of the primary winding will be in the direction which promotes soft switching, without loss, of that of the two switches which reclose.

According to this embodiment, said control means of the alternation of the two switches deliver square signals of identical and constant frequencies, the duration of a square wave of one determining the duration of closing and of one of the switches, this latter duration being modulated as a function of the different between the output voltage and a reference voltage, whilst the second signal controls the opening of the second switch before the closing of the first switch and the closing of said second switch after the opening of the first switch, the offsets between the opening of one of the switches and the closing of the other switch being equal and constant.

Such a converter combining switching at zero voltage at the primary of the insulating transformer with quasi-resonant switching at zero current in the secondary, ensures excellent regulation of the output voltage, even with large variations of the input voltage, without substantial alteration of the soft switching conditions at the level of the switches of the primary, with as a result very reduced switching losses, but also almost no conduction losses.

Other characteristics and advantages will become apparent from the description which follows of a preferred embodiment of the device of the invention, which description is given solely by way of example and with respect to the accompanying drawings, in which:

FIG. 5 is a circuit diagram of the secondary of a converter of the prior art;

FIGS. 7a to 7d are time diagrams relating to the control circuit of the switches of the device of the invention.

FIG. 1 shows a converter with chopping regulation with soft switching, of known principle, with an insulating transformer with a primary circuit with half-bridge mounting.

The transformer comprises a part of the primary core Np and a part of the secondary core Ns.

The polarized end of the primary winding, at which the voltage Vc is available, is connected by means of condensers to the input terminals of the input voltage Ve, whilst the other end of said winding, at which the voltage Vp is available, is connected to these same terminals via two electronic switches, respectively INT1 and INT2.

The polarized end of the secondary winding is connected by a diode D1 and an inductance L to one of the output terminals of the converter between which is available the output voltage Vo.

The other end of the secondary winding is connected to the other output terminal.

A rectifying diode D2 is mounted between one of the ends of the secondary winding and the junction diode D1-inductance L. Finally, a condenser Cs is mounted between the output terminals of the converter.

The chain of control of the switches INT1 and INT2 comprises a differential amplifier 1 connected to the output of the converter, a circuit 2 for regulation by modulation of the pulse width, two circuits G1 and G2 for generating dead time tm connected one directly to the circuit 2, the other indirectly to this latter, via an invertor 3, each circuit G1, G2 controlling the opening/closing of one of the switches INT1, INT2.

Figures 2A, 2B, 2C, 2D, 2E, 2F, 2G:
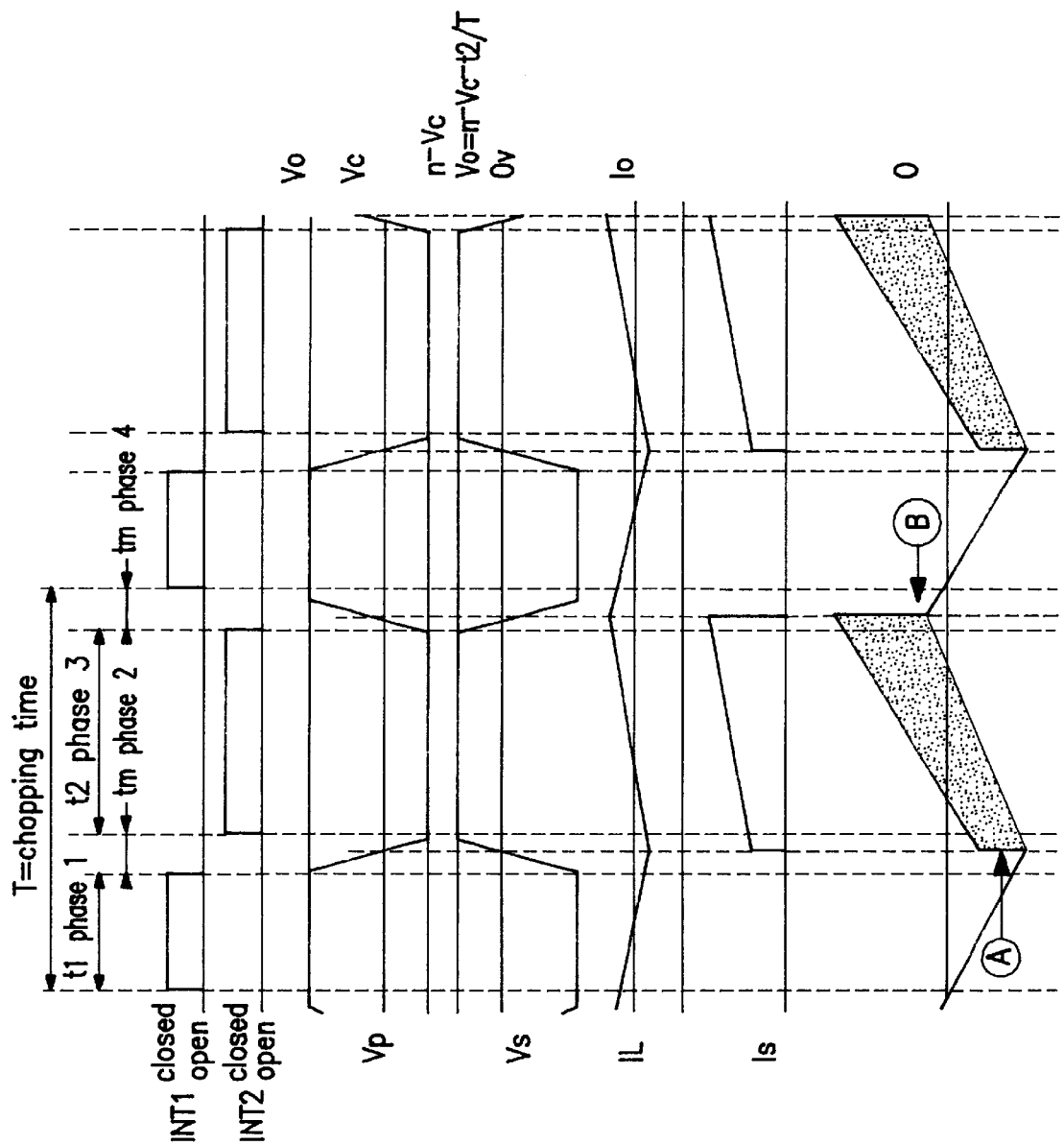
FIGS. 2a to 2g are time diagrams relating to the circuit of FIG. 1.

FIGS. 2a, 2b ; show the shape of the opening/closing control signals of the switches INT1 and INT2, generated by the circuits G1, G2.

FIGS. 2c and 2d show respectively the variations of potential Vp and a voltage Vs at the terminals of the secondary winding;

FIGS. 2e, 2f, and 2g show respectively variations of the current IL passing through the inductance L, of the current Is of the secondary winding and of the current Ip of the primary winding.

In FIG. 2a, T is the chopping period (opening/closing cycle of each switch INT1, INT2), an equal dead time tm being provided between alternate actuations of these switches such that a simultaneous open condition of these latter will be obtained with two restarts in each chopping period.

In the diagram of FIG. 2g it will be seen that the switchings during two dead times tm, respectively at the point A (just before the switch INT2 closes) and at the point B (just before the switch INT1 closes) take place in a soft manner because the current Ip is in the right direction, which is to say in the direction which will naturally charge or discharge the parasitic condensers of the switches INT1 and INT2 such that the potential Vp will develop simultaneously as shown in the diagram of FIG. 2c.

However, such a device has its limits. When in effect the range of variation of the input voltage Ve tends to be great, with a high value of Ve corresponding to a speed of the current Ip in the region of point A such that it becomes positive and increases until just before the switch INT2 closes at the end of the first dead time tm of FIGS. 2a, 2b.

One thus departs from the conditions of soft switching and the fact of increases sufficiently the amplitude of the current Ip such that the point A remains within negative values, gives rise to serious problems of loss by conduction.

Figure 3:
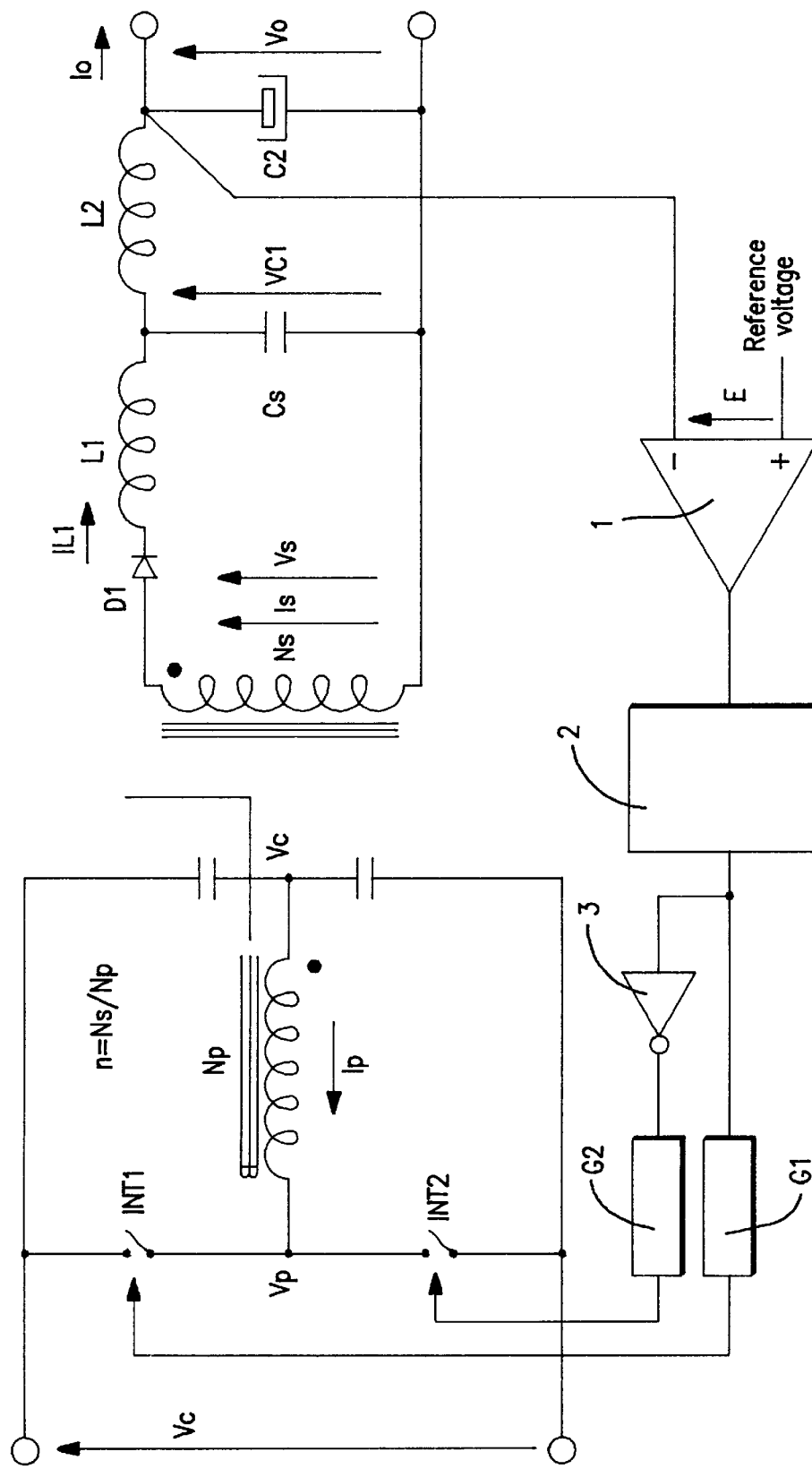
FIG. 3 is a circuit diagram of a converter according to the invention.

To overcome these problems, the invention proposes to modify the circuit of the secondary as shown in FIG. 3.

Figure 1:
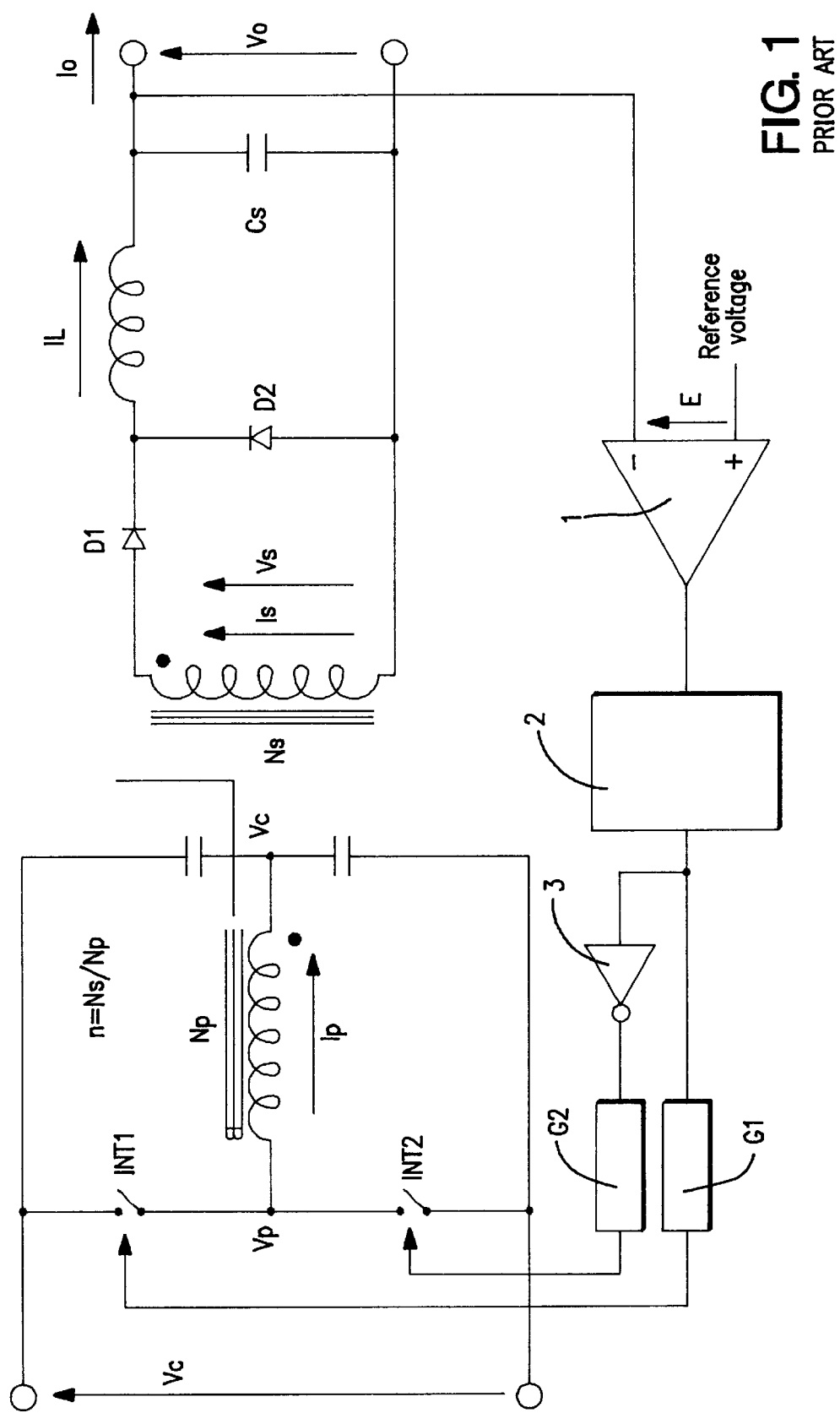
FIG. 1 is a circuit diagram of a converter of the prior art, of the soft switching type.

To this end, in FIG. 3, to the conventional rectifying-filtering circuit L2, C2, (corresponding to the circuit L, Cs of FIG. 1) is added a resonant circuit L1, C1, at the output of diode D1, the diode D2 of FIG. 1 being omitted.

The wave diagrams of FIGS. 4a, 4b, 4c, 4d, 4e, 4g and 4h correspond respectively to those of FIGS. 2a, 2b, 2c, 2g, 2d, 2f and 2e.

The nature of the secondary circuit of the converter of the invention permits giving to the current Is returned to the primary a sinusoidal shape (FIG. 4g) having, in contrast to the rectangular shape with a steep front (FIG. 2f), soft fronts.

These soft fronts maintain, in the switching region A (just before the switch INT2 closes, FIG. 4d) the current Ip on this side of zero, the current tending toward zero, which ensures soft switching, although in the switching region B, said current Ip tending toward zero is always positive just before the switch INT1 closes.

This sinusoidal shape of said current Is returned to the primary is precisely obtained by the type of resonant circuit with zero current of the secondary stage of the converter.

For more details as to such a resonant circuit with zero current, known per se, reference is made to FIG. 5 and to the associated wave form diagrams of FIGS. 6a to 6d.

FIG. 5 shows a secondary circuit of a chopping circuit with forced switching of the type of that disclosed in U.S. Pat. No. 4,415,959 and adapted for input voltages not exceed several tens of volts.

Such a secondary is similar to that of FIG. 3 (the homologous components bear the same reference numerals) with in addition a diode D2 in parallel with the condenser C1.

FIGS. 6a to 6d show diagrams respectively of the voltage Vs at the terminals of the secondary winding, of the voltage VC1 at the terminals of C1, of the current Is of the secondary and of the current IL2 passing through the inductance L2.

In such a circuit, the shape of the current Is (FIG. 6c) is quite sinusoidal when the voltage is Vs.

In the course of phase 1, the voltage Vs, the inductance L2 change linearly as to current Is until the value of the current IL2 passing through the inductance L2 is reached and which is near the supply current Io of the load, the voltage VC1 at the terminals of the condenser C1 remaining zero.

In the course of phase 2, the elements L1, C1 are in resonance, the voltage VC1 (FIG. 6b) and the current Is (FIG. 6c) having a sinusoidal appearance, the voltage VC1 rising to twice the voltage Vs.

In FIG. 3, the diode D1 is blocked in reverse, first by the current Is which is cancelled, then by the fall of the voltage Vs, the condenser C1 being discharged linearly by the current IL2.

In phase 4, the current IL2 continues to flow through the free wheel diode D2, the voltage VC1 remaining zero. Thus, the voltage VC1 is filtered by L2, C2 such that its mean value equals the output voltage Vo.

The regulation of the output voltage Vo thus depends on the shape of VC1, which is to say of Vs, of Io and of the frequency of repetition of the cycle of phases 1 to 4. If the voltage Vs is imposed by the input voltage Ve of the converter, the regulation, in this type of apparatus of FIG. 5, of the output voltage Vo as a function of Io and of the input voltage Ve thus consists in causing to vary this frequency.

On the contrary, in the mounting of the secondary (FIG. 3) of the converter of the invention, the free wheel diode D2 of FIG. 5 has been omitted, such that the cycle of phases 1 to 4 is replaced by the cycle (FIG. 4*h*) with two phases 1 and 2. Phase 1, corresponding to phases 1 and 2 of FIGS. 6*a* to 6*d*, is a resonance phase and phase 2 is a linear discharge phase of the condenser C1 by the current IL2, which is semi-constant, corresponding to phase 3 of FIGS. 6*a* to 6*d*. The disappearance of phase 4 is caused by the omission of the diode D2.

The difference in mounting between the two secondaries of FIGS. 3 and 5 gives rise to the following essential consequences.

Figures 4A, 4B, 4C:
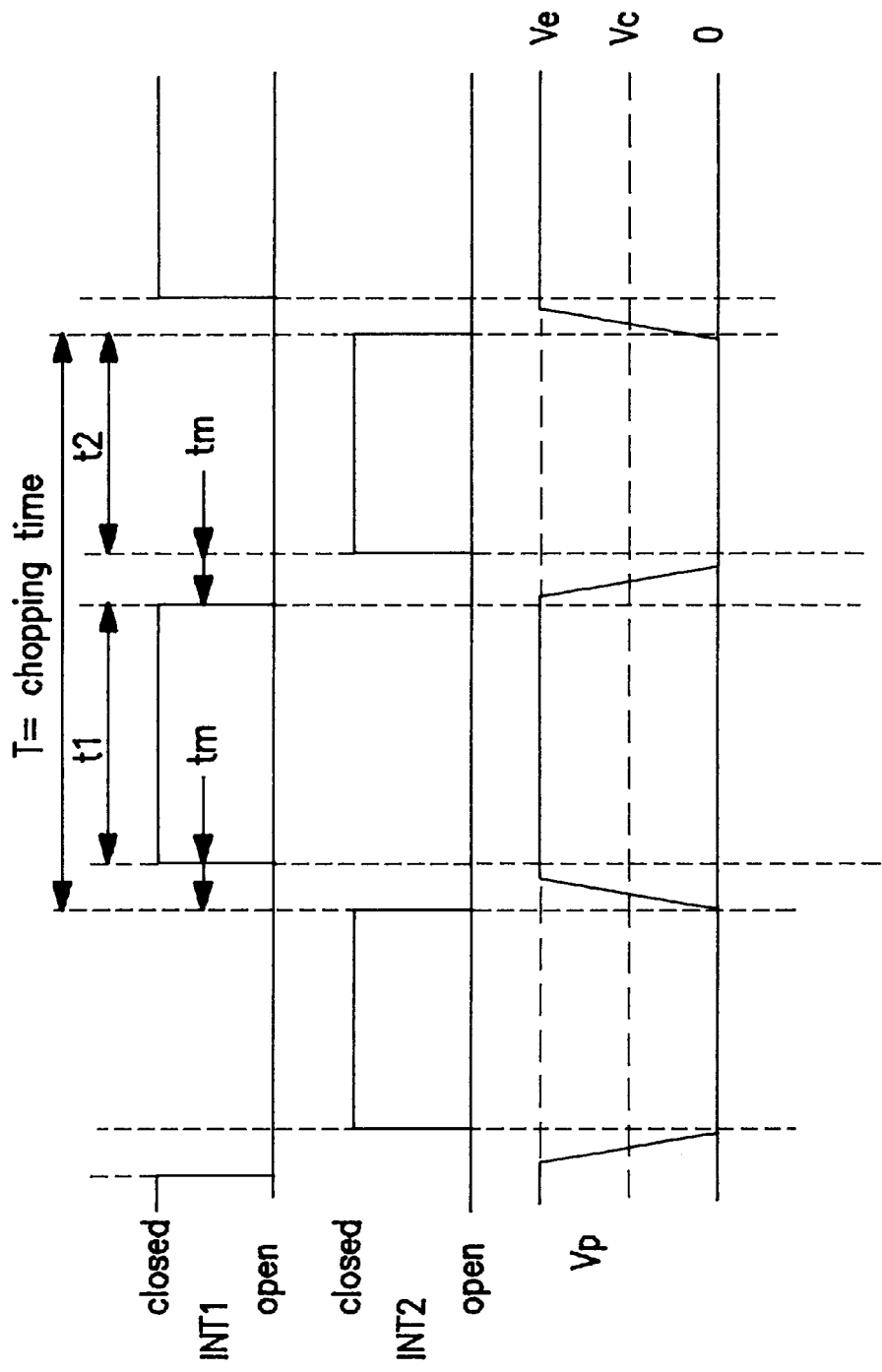
FIGS. 4a to 4g are time diagrams relating to the circuit of FIG. 3.
Figures 4D, 4E, 4F, 4G, 4H:
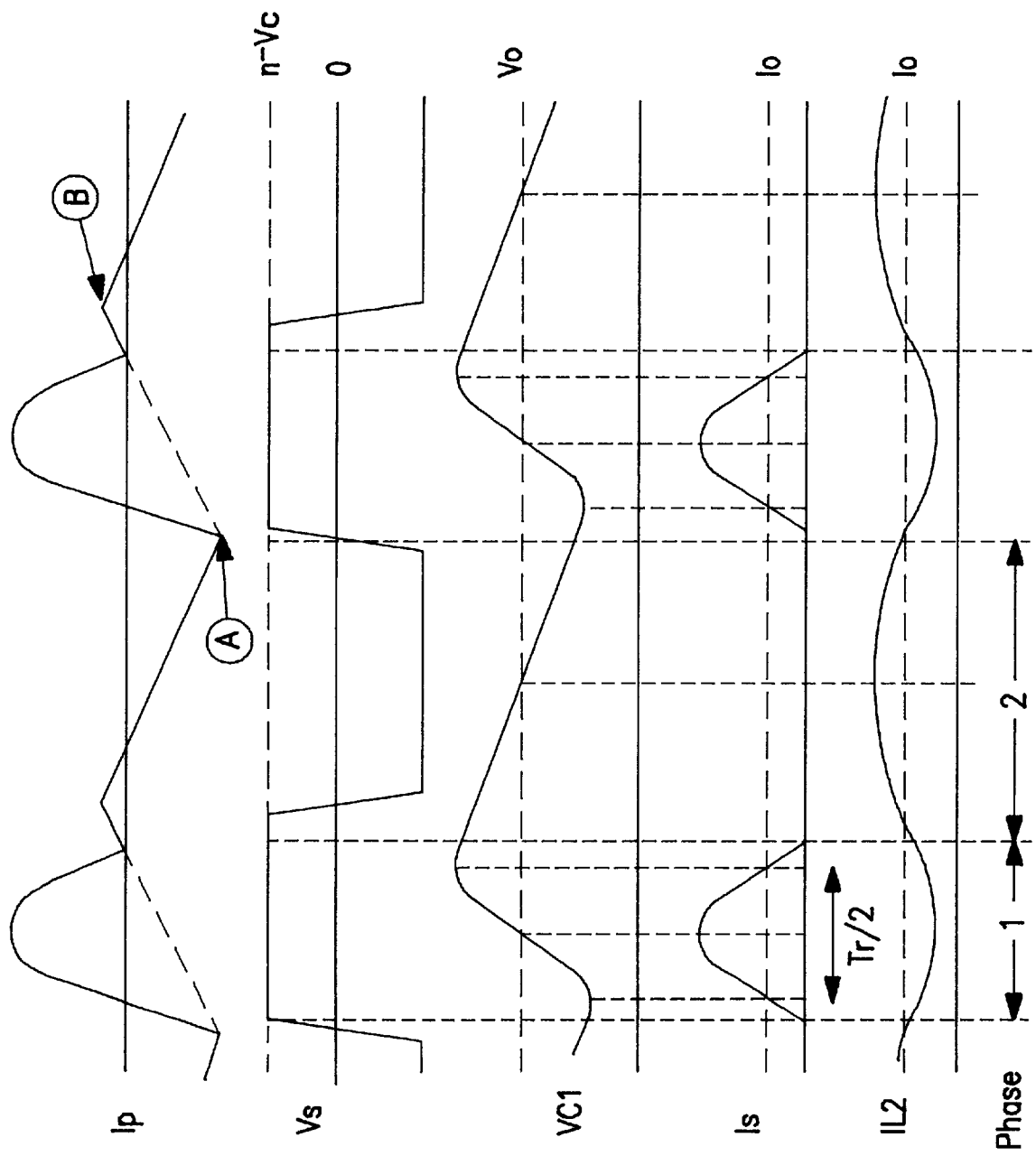
Figures 6A, 6B, 6C, 6D:
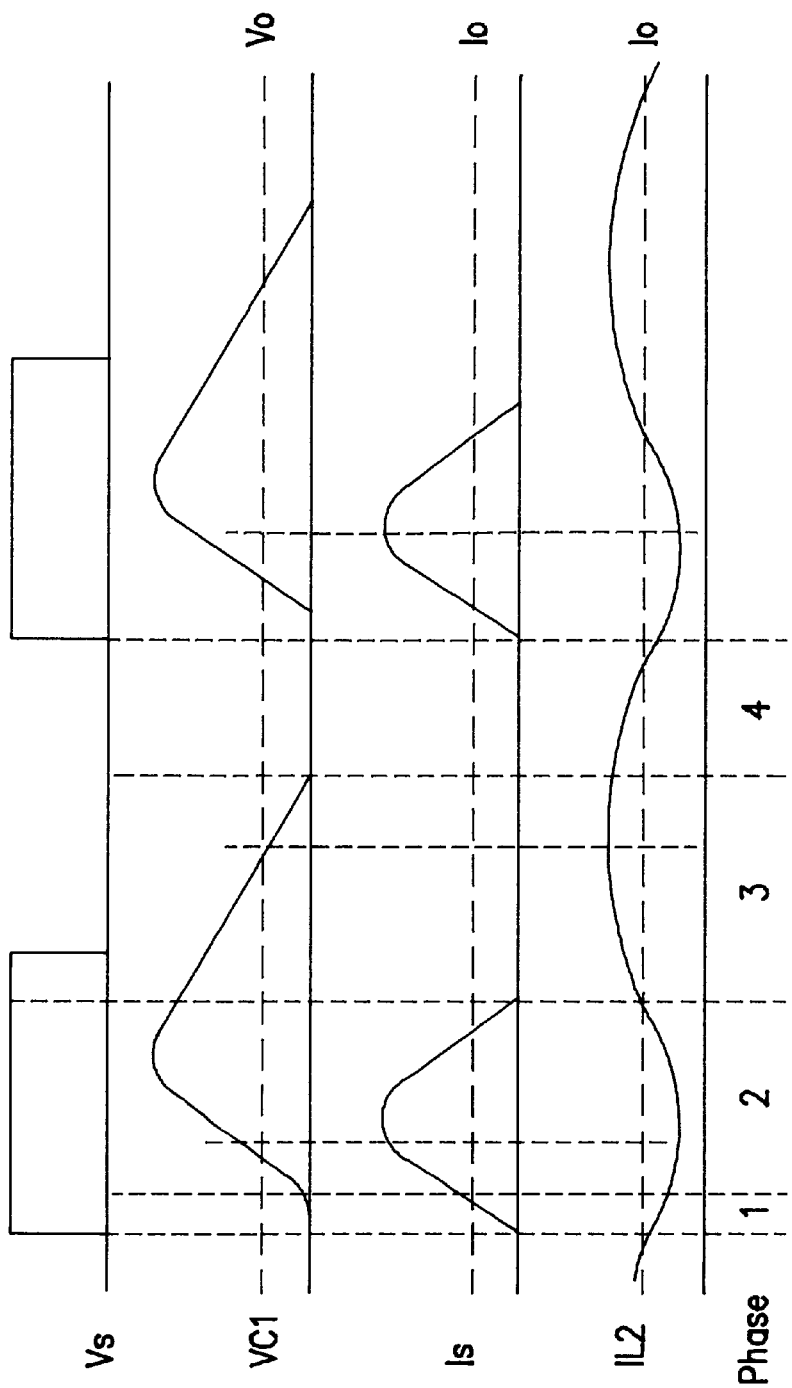
FIGS. 6a to 6d are time diagrams relating to the circuit of FIG. 5.

The shape of the voltage VC1 (FIG. 4*f*) is symmetrical about the value of the input square wave of voltage Vs (FIG. 4*e*). The filtering of VC1 at its mean value by L2, C2 gives the voltage Vs which is the same as the output voltage Vo.

Thus, Vo=Vs no matter what the frequency of repetition and the output current Io. It is also to be noted that VC1 can be negative on the condition that during phase 2, VS remains at an algebraic value lower than VC1, the diode D1 being blocked in reverse. This characteristic distinguishes fundamentally this device from that of FIG. 5 (also compare FIG. 6*b*).

The regulation of the output voltage Vo is accordingly very simple. It does not depend on said frequency but only on the amplitude of the input square wave of voltage Vs.

In the device of FIG. 3, the voltage Vs will thus be regulated as a function of the input voltage Ve through the time t1 (FIG. 4*a*) defined by a period T for a suitable chopping of the control signals of the switches INT1 and INT2 of the half-bridge mounting of the primary.

The regulation function is simple and independent of the load. Only the amplitude peak to peak of the voltage VC1 is connected to that of the output current Io and the operation under vacuum with Io=0 gives rise to no problem.

Moreover, the assembly of the phase 1 (FIGS. 4*f* and 4*g*) is constituted by sinusoidal signals. The duration of phase 1 is constant and breaks down (FIG. 4*g*) into a half-period of duration Tr/2 (FIG. 4*g*) at the resonance frequency given by L1, C1 and two intervals located on opposite sides.

The duration of the input square wave Vs can be as desired comprised between the duration of phase 1 and the duration of phase 1 plus half the duration of phase 2, or even more. This possibility of variation will be used in the half-bridge stage to cause t1 (FIG. 4*a*) to vary as a function of the input voltage Ve and to obtain Vs=a constant=Vo.

Finally, the omission of diode D2 gives the advantage of having less conduction loss or reverse current and gives rise to a reduction of the size of the device and its cost.

FIGS. 7*a* to 7*d* show by way of example the wave forms generated by the control circuit of the switches INT1 and INT 2 of the primary of the converter of FIG. 3.

FIG. 7*a* shows the square signal Va generated by the circuit 2, when the amplifier 1 detects a difference between the output voltage Vo and a reference voltage higher than a predetermined threshold.

FIG. 7*b* shows the signal Vb which is the reverse of Va and FIGS. 7*c* and 7*d* show respectively the signals Vd for controlling the switch INT1 and Vc for controlling the switch INT2, delivered respectively by the circuits G1 and G2.

The circuit (1 to 3, G1, G2) carries out a modulation of the pulse width t/T=a function of said difference detected by the amplifier 1 so as to obtain the time t1 defining the length of the square wave of voltage Vs. Vc is generated from Vb and Vd from Va, the descending fronts being transmitted without delay and the rising fronts being transmitted with a delay tm.

In short, and in other words, the converter of the invention permits displaying the following results.

There is observed a soft switching at zero voltage in the primary. Thus, the opening of one of the switches (for example INT1), at the beginning of an interval tm, the current in the winding of the primary persists thanks to the magnetizing current and to a current to the secondary returned to the primary (Is) in sinusoidal shape. This current is in the direction which promotes the natural switching without loss (transition A) from the other switch (INT2). At the transition A, thus, when the switch INT1 is open, the current from the primary of the transformer (Ip) is negative and flows from point Vp toward the point Vc. It charges the parasitic capacitance of the switch INT1 and discharges that of INT2, the potential at the terminals of INT2 decreases to nothing. The primary current continues thus to flow in the parasitic diode of INT2 at the same time that it decreases in amplitude. The switch INT2 is then opened before it becomes positive. The power loss in switching is zero.

By regulating the amplitude of the magnetizing current, the value of the inductance of the transformer is determined, so that this amplitude will be greater than twice the mean value of the secondary current brought to the primary, there will be a current Ip which will be, during the time tm during which the switch INT1 (transition B) is closed, sufficiently positive also to control a soft switching for the other switch.

These natural switchings, without loss, are obtained without adding a resonant circuit.

The switches INT1 and INT2 are for example MOS transistors. They can be constituted by other components such as particularly bipolar transistors, GTO or IGBT. MOS transistors have, by virtue of their nature, parasitic components (capacity and diode) and if the types of switch chosen do not include such components, in particular the diode function, it will then be necessary to add such function, which is necessary to the good operation of the device.

The diode D1 is switched into blocked position and vice versa, under conditions di/dt and dv/dt lower than in the prior art, hence with less loss by reverse recovery.

The law of regulation is Vo=Vs=n*Vc=n*Ve*t1/T. It is linear and permits obtaining a range of variation of Ve in at least the ratio of 2. The process of regulation is obtained by causing t1 to vary whilst preserving tm=cte and t1+t2+ 2*tm=cte=1/F or F=frequency of chopping.

Theoretical computations show that the magnetizing current increases with Ve whilst preserving the bias of regulation Vo=cte. This is favorable to the soft switching criteria.

The operation at fixed frequency permits synchronizing several converters.

Finally, the measure of amplitude of VC1 is a good means to measure the output current Io and to implement the functions such as: limitation of current, current safety and safety from short circuit, automatic control with current loop in parallel of several modules for equal distribution and controlled by the respective currents.

According to the invention, there has thus been provided, by way of example, a converter of the type of FIG. 3, of 30 watts, having several outputs of different values: 3.3; 5; 12; 15; 24 and 28 volts, regulated over a range of values of input voltage between 200 and 400 volts, the chopping frequency being 500 KHz.

Such a converter had an efficiency of 92% for 15 volts at the outlet and had a volume of 35.6×52.5×12.7 mm, which is to say two to three times smaller than that of present converters.

It is to be noted that the converter can have several identical outputs, for example mono-alternation as shown in the drawings.

Furthermore, the inductance of resonance L1 can be a discrete component or form an integral portion of the inductance of transformer loss.

FIGS. 8a to 8g show wave diagrams corresponding to a modified embodiment of the converter consisting essentially of a modification of the dimensioning of the resonant circuit L1C1 of the device of FIG. 3, this circuit being thus exchanged.

Independently of different dimensioning, gives rise to lower frequency of resonance, the device operates on the same principle with the same controls and same commands.

The object sought by such different dimensioning is to provide switching at zero voltage, hereinafter ZVS, of each primary switch (INT1, INT2) following the opening of the other switch. Referring to FIG. 4d, it will be seen that the condition ZVS is present if the primary current is negative at A and positive at B, all the time of the switching, which takes place at the beginning of the flow of time intervals tm.

ZVS switching at A is ensured thanks to two parameters: the semi-resonance in current at the secondary returns to the primary at current at A which progressively increases. In the converter of the invention, the primary current at A remains easily negative, the time during which the ZVS switching is performed. The equilibrium of the primary capacitative bridge ensures that the mean primary current is zero. The presence of the output current Io gives rise to an offset in the negative of the mean current magnetizing the transformer and an even greater negative value of the primary current at A. As a result, the more the converter supplies output power, the more the ZVS condition at A is ensured.

As to the ZVS switching at B, the current returned from the secondary is zero and only the primary magnetizing current must fulfill the condition of being positive. Contrary to point A, but for the same reason, the more the converter supplies outlet power, the more the offset in the negative of the mean magnetizing current drives the primary current toward the negative at the point B.

Thus, so as to have at the point B a primary current which remains positive, so as to carry out the condition ZVS at said point B, the resonant circuit L1C1 is dimensioned with a lower resonance frequency, hence a longer period. At point B, there is thus obtained a secondary current which is not zero, which superposes on the magnetizing primary current a value which is positive, contributing to the conservation at B of a primary positive current. In other words, the phase of quasi resonance in the current is interrupted by the anticipated opening of the switch INT2. One can thus minimize the amplitude of variation of magnetizing current as well as the losses by conduction which result therefrom whilst conserving the proper ZVS switching at B.

Figures 8D, 8E, 8F, 8G:
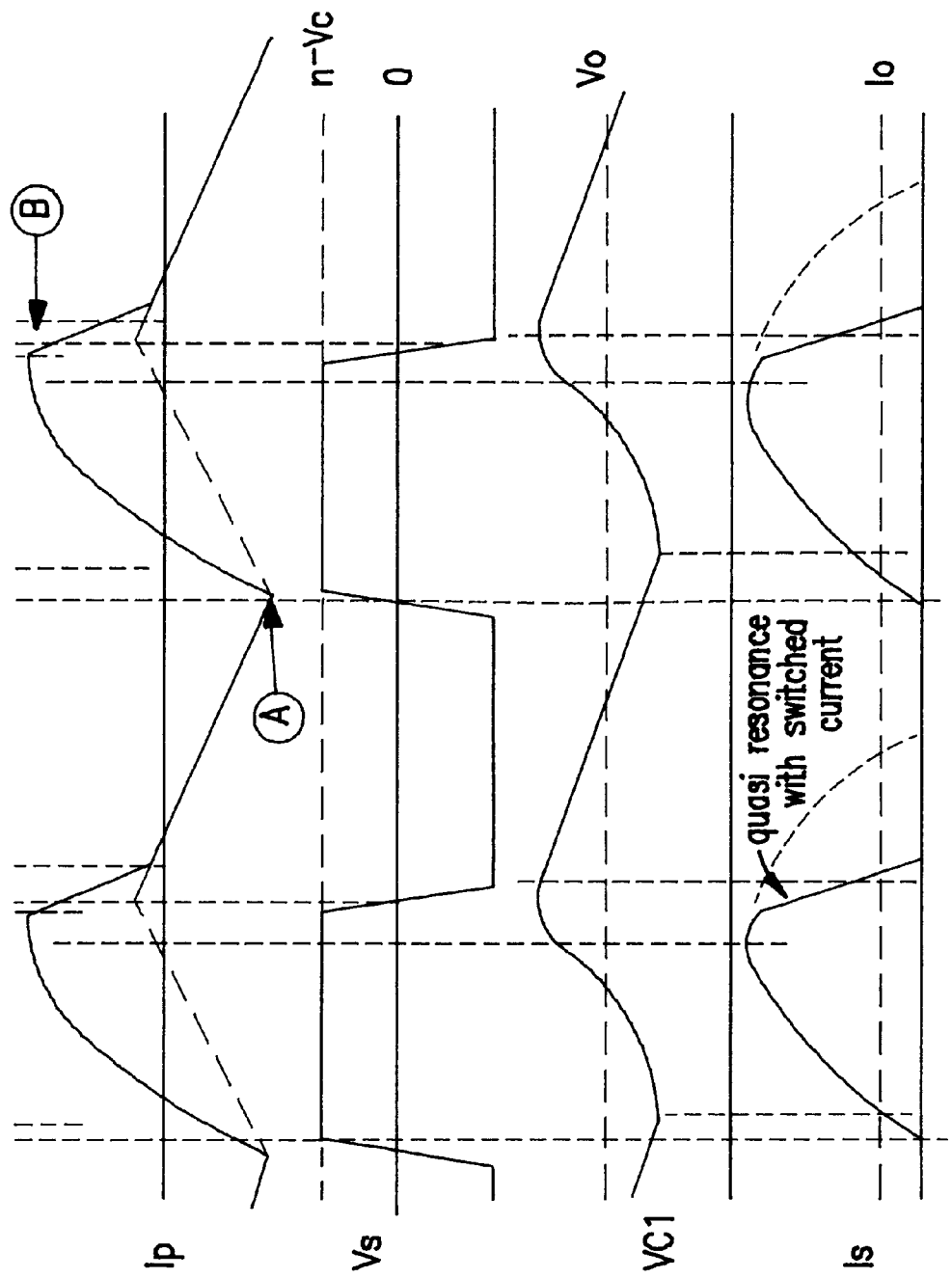
FIGS. 8a to 8g are time diagrams relating to a modified embodiment of the converter of the invention.
Figure 1:
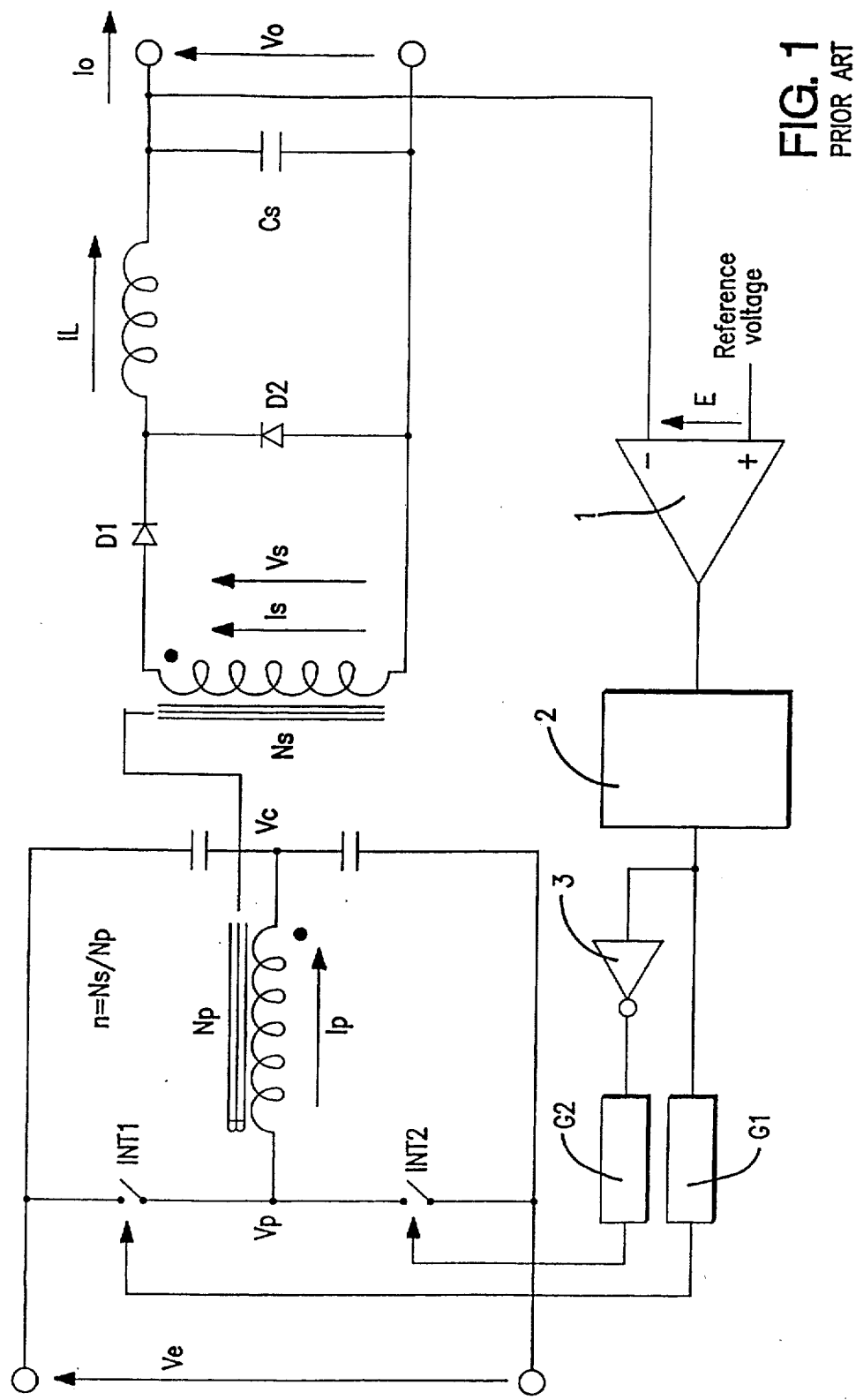
Figures 2A, 2B, 2C, 2D, 2E, 2F, 2G:
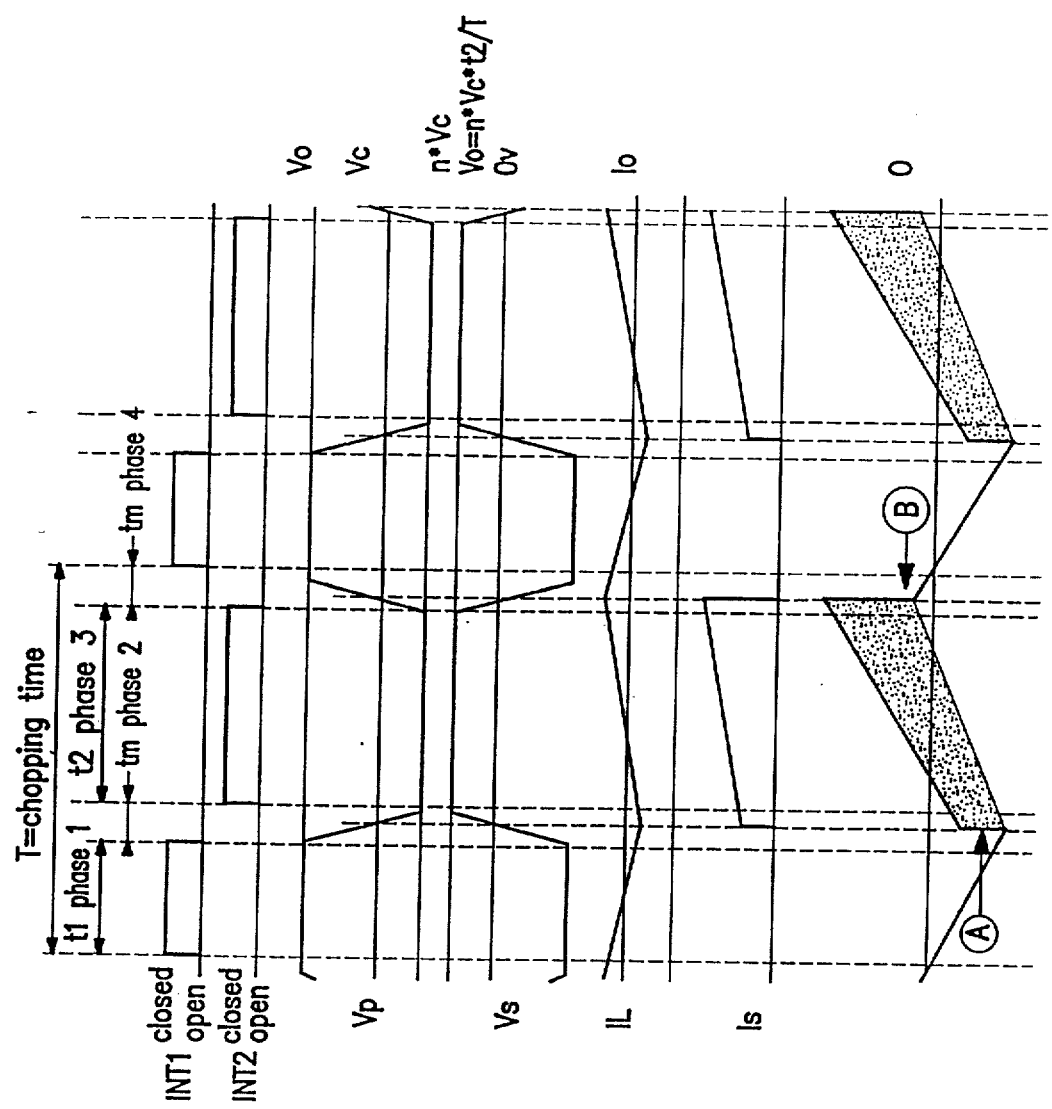
Figure 3:
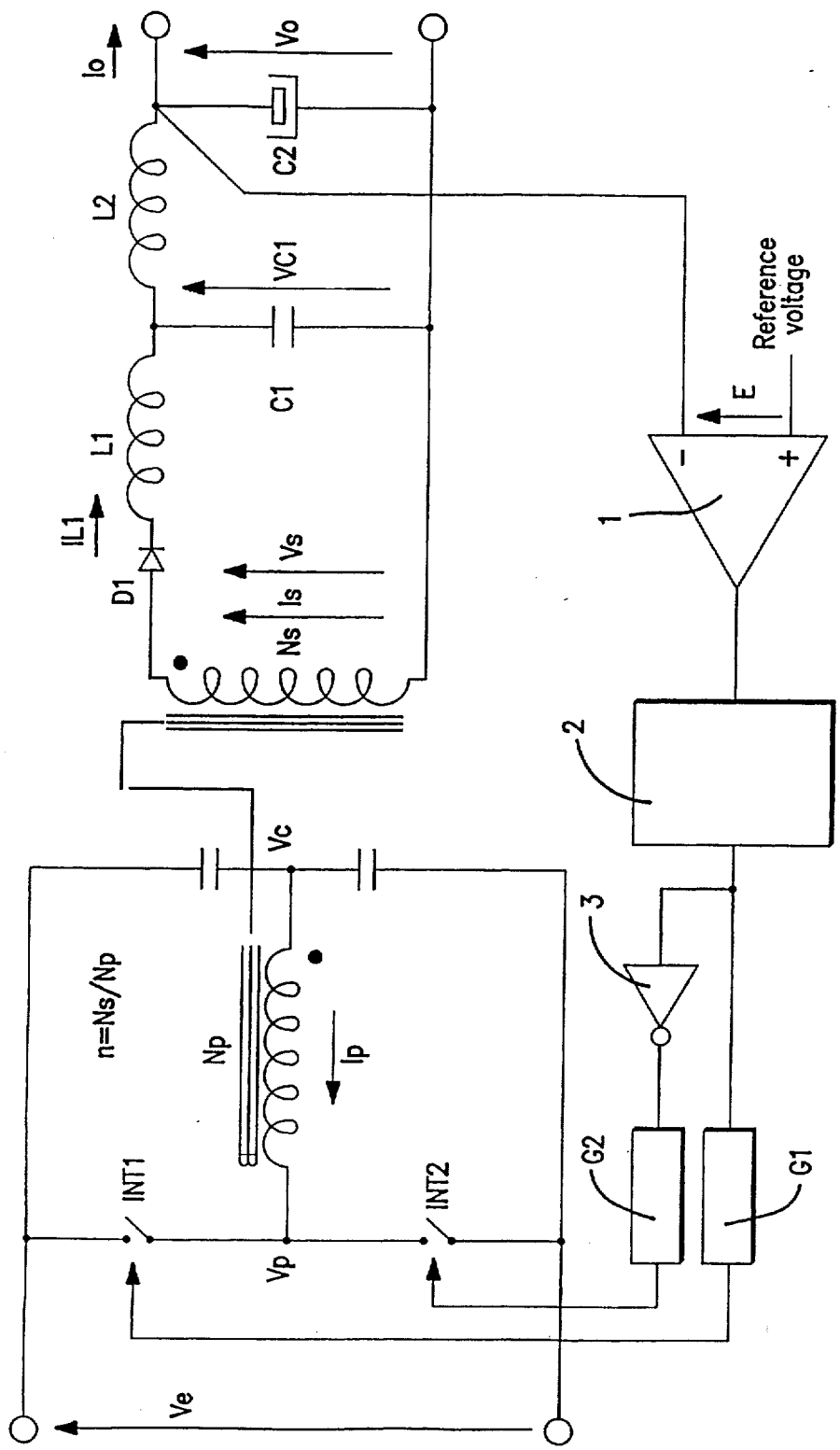
Figures 4A, 4B, 4C:
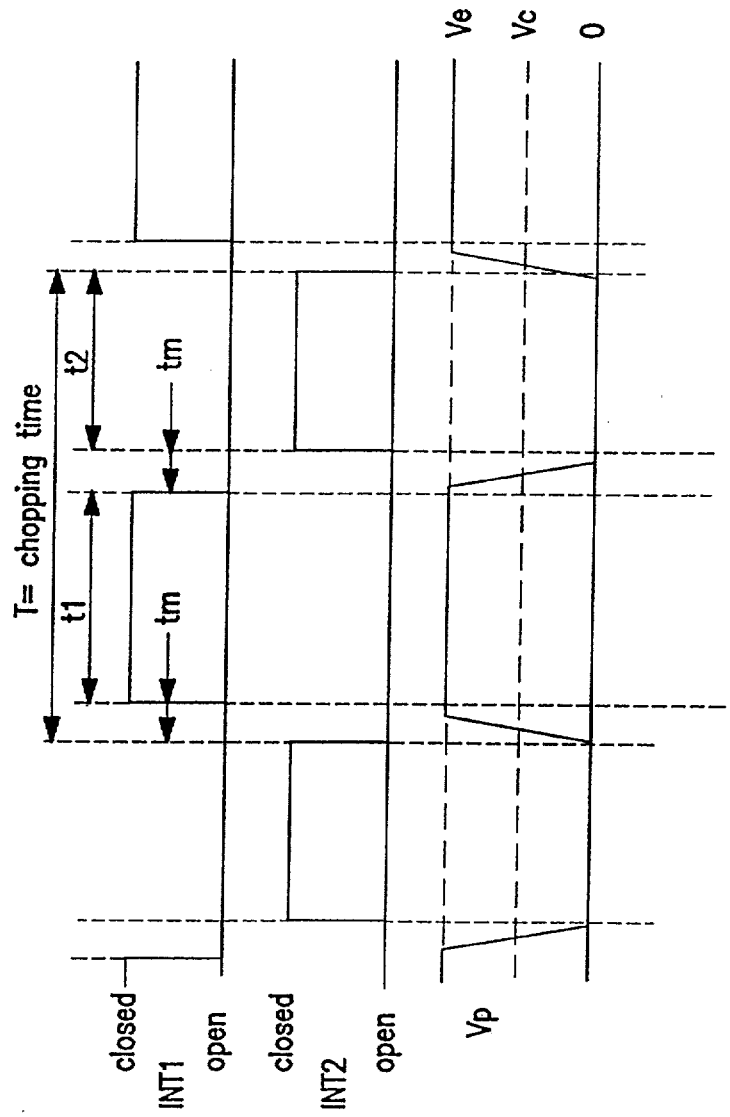
Figures 6A, 6B, 6C, 6D:
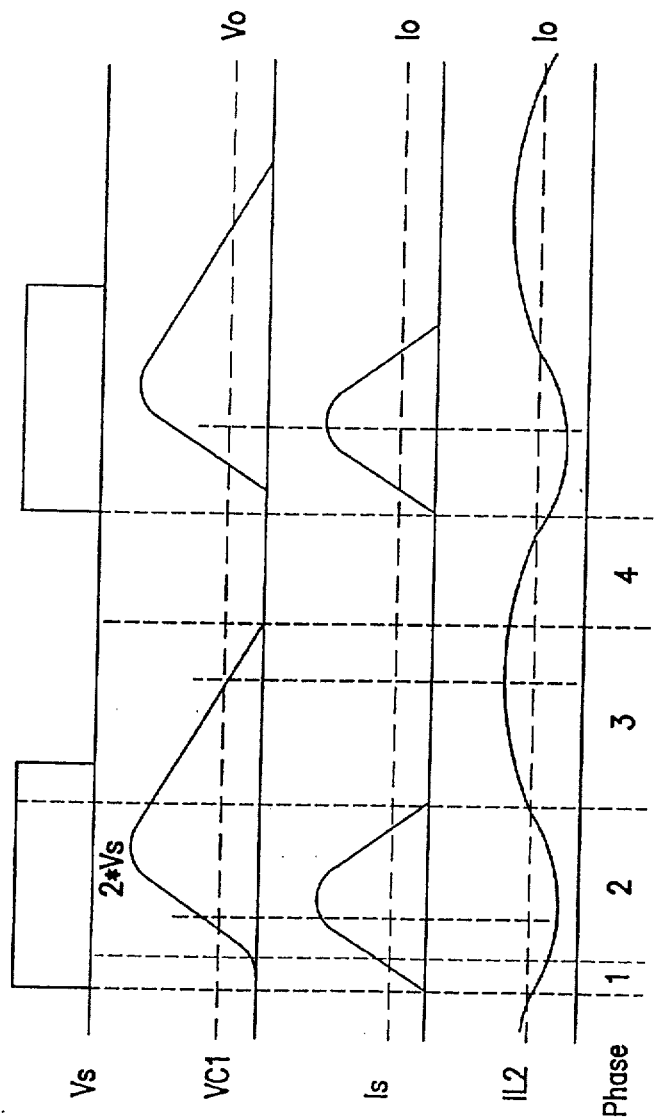
Figures 8A, 8B, 8C:
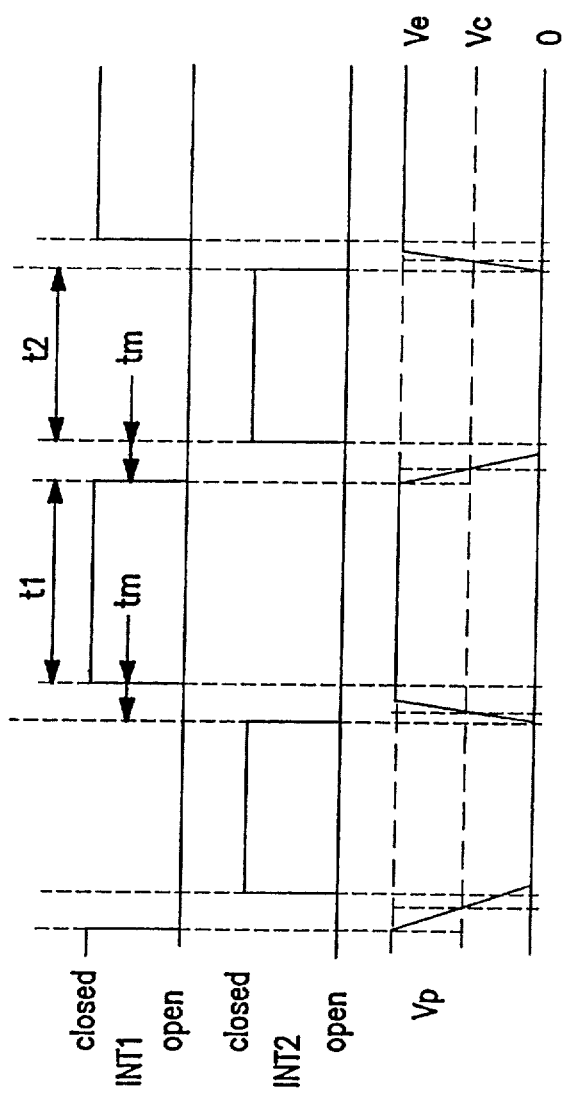

FIGS. 8d, 8f and 8g show what precedes, FIGS. 8a, 8b, 8c and 8e being identical to FIGS. 4a, 4b, 4c and 4e.

In particular, it will be noted that in FIG. 8d the offset is very marked toward the positive, of current Ip at the point B, and in FIG. 8g the quasi-resonance phase of interrupted current from INT2.

The invention is of course applicable to other mountings of the primary than those of FIG. 3 and, generally speaking, to any primary, particularly of the Buck type, comprising two switches controllable in alternation so as to obtain a soft switching at zero voltage.

LEGEND ASSOCIATED WITH FIG. 2g

—— Ip of zero mean value

▨▨ Is return to the primary

- - - Magnetizing current of mean value=mean value of ▨▨

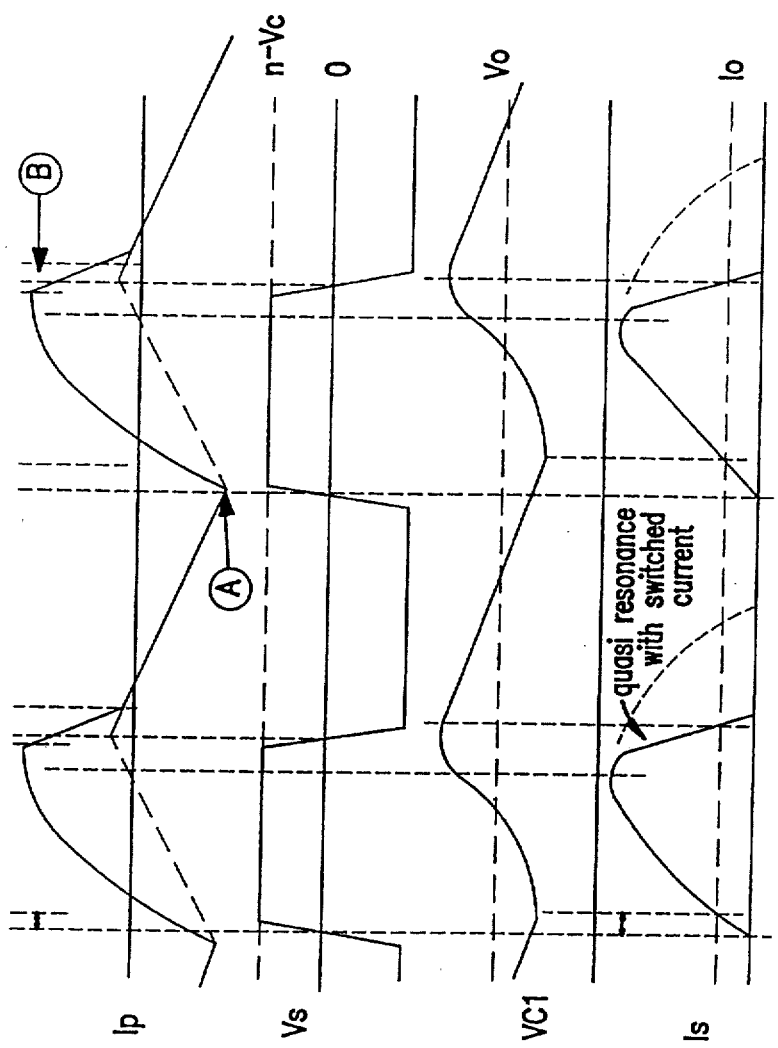

We claim:

1. Continuous voltage converter with soft switching, comprising a transformer (Np, Ns) whose primary is particularly of the type with a half-bridge mounting and is adapted to be connected to a source of input voltage (Ve) by means of two electronic switches (INT1, INT2) and of which the secondary, of mono-alternating type, is adapted to be connected to a load by means of a series inductance (L2) and means (1 to 3, G1, G2) to control alternatingly the two switches, at fixed frequency, according to a regulation by modulation of pulse width as a function of the outlet voltage (Vo), thereby to provide for said primary a commutation at zero voltage, said converter being characterized in that said secondary comprises moreover a resonant circuit (L1, C1) without free-wheel diode so as to carry out in said secondary a quasi-resonant switching at zero current.

2. Converter according to claim 1, characterized in that the secondary circuit comprises, in addition to a rectifying-filtering circuit (L2, C2) of conventional type, a resonant circuit comprising a condenser (C1) and an inductance (L1) of low value, said resonant circuit (L1, C1) being adapted to create in the secondary winding (Ns) of said transformer, at each opening/closing cycle of the switches (INT1, INT2), a sinusoidal shaped current (Is) which is zero or passes through a zero value in intervals of time (tm) during which the two switches (INT1, INT2) are both open, such that the current (Ip) of the primary winding (Np) will be in the direction which promotes soft switching, without loss, of that of the two switches which close.

3. Converter according to claim 2, characterized in that said alternating control means of the two switches (INT1, INT2) deliver square signals (Vc, Vd) of identical and constant frequencies, the duration (t1) of a square wave of one (Vd) determining the duration of closure of one of the switches, this latter duration being controlled as a function of the difference between the output voltage (Vo) and a reference voltage, whilst the second signal (Vc) controls the opening of the second switch before the closing of the first switch and the closing of said second switch after the opening of the first switch, the intervals (tm) between the opening of one of the switches and the closing of the other switch being equal and constant.

4. Converter according to one of claim 1, characterized in that said resonant circuit (L1, C1) of the secondary is dimensioned with a resonance frequency sufficient low to obtain a primary current of an appropriate sign permitting having switching at zero voltage of each switch (INT1, INT2) upon the opening of the other.

\* \* \* \* \*

UNITED STATES PATENT AND TRADEMARK OFFICE
CERTIFICATE OF CORRECTION

PATENT NO. : 5,903,446
DATED : May 11, 1999
INVENTOR(S) : Huillet, et al

It is certified that error appears in the above-identified patent and that said Letters Patent is hereby corrected as shown below:

The title page, showing the illustrative figure, should be deleted and replace with the attached title page.

In the Drawings:

The Drawing Sheets, consisting of Figs. 1-8G, should be deleted and replaced with the drawings, as shown on the attached page.

Signed and Sealed this

Twenty-fourth Day of October, 2000

Attest:

Q. TODD DICKINSON

*Attesting Officer*  *Director of Patents and Trademarks*

United States Patent [19]

Huillet et al.

[11] Patent Number: 5,903,446
[45] Date of Patent: May 11, 1999

[54] DIRECT CURRENT VOLTAGE CONVERTER WITH SOFT SWITCHING

[75] Inventors: Henri Huillet, Merignac; Didier Ploquin, Martignas, both of France

[73] Assignee: Gaia Converter, Merignac, France

[21] Appl. No.: 09/029,753
[22] PCT Filed: Aug. 29, 1996
[86] PCT No.: PCT/FR96/01330
§ 371 Date: May 7, 1998
§ 102(e) Date: May 7, 1998
[87] PCT Pub. No.: WO97/08812
PCT Pub. Date: Mar. 6, 1997

[30] Foreign Application Priority Data

Aug. 30, 1995 [FR] France ................. 95 10362

[51] Int. Cl.$^6$ ................................. H02M 3/335
[52] U.S. Cl. ............................. 363/17; 363/21
[58] Field of Search ............... 363/17, 21, 25, 363/97

[56] References Cited

U.S. PATENT DOCUMENTS

| | | | |
|---|---|---|---|
| 4,720,668 | 1/1988 | Lee et al. ....................... | 323/271 |
| 4,823,249 | 4/1989 | Garcia, II ....................... | 363/24 |
| 5,177,675 | 1/1993 | Archer ............................ | 363/25 |
| 5,262,930 | 11/1993 | Hua et al. ...................... | 363/21 |
| 5,434,767 | 7/1995 | Bararseh et al. .............. | 363/16 |
| 5,729,444 | 3/1998 | Perol .............................. | 363/25 |

Primary Examiner—Stuart N. Hecker
Attorney, Agent, or Firm—Young & Thompson

[57] ABSTRACT

The invention relates to a continuous voltage converter with soft switching, comprising a transformer (Np, Ns) whose primary is particularly of the type with a half-bridge mounting and is adapted to be connected to a source of input voltage (Ve) by means of two electronic switches (INT1, INT2) and whose secondary, of the mono-alternating type, is adapted to be connected to a load by means of an inductance in series (L2) and means (1 to 3, G1, G2) to control alternatingly the two switches, at fixed frequency, according to a regulation by modification of the pulse width as a function of the output voltage (Vo), so as to provide to said primary a switching at zero voltage, said converter being characterized in that said secondary comprises moreover a resonant circuit (L1, C1) so as to provide for said secondary a quasi-resonant switching at zero current.

4 Claims, 9 Drawing Sheets

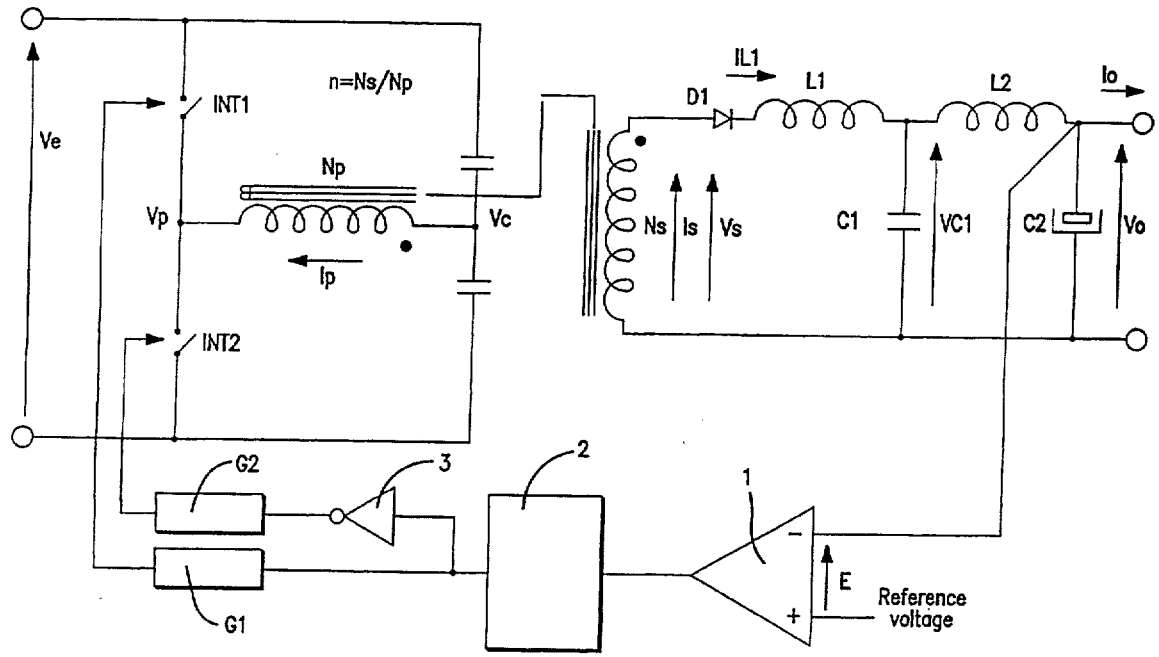

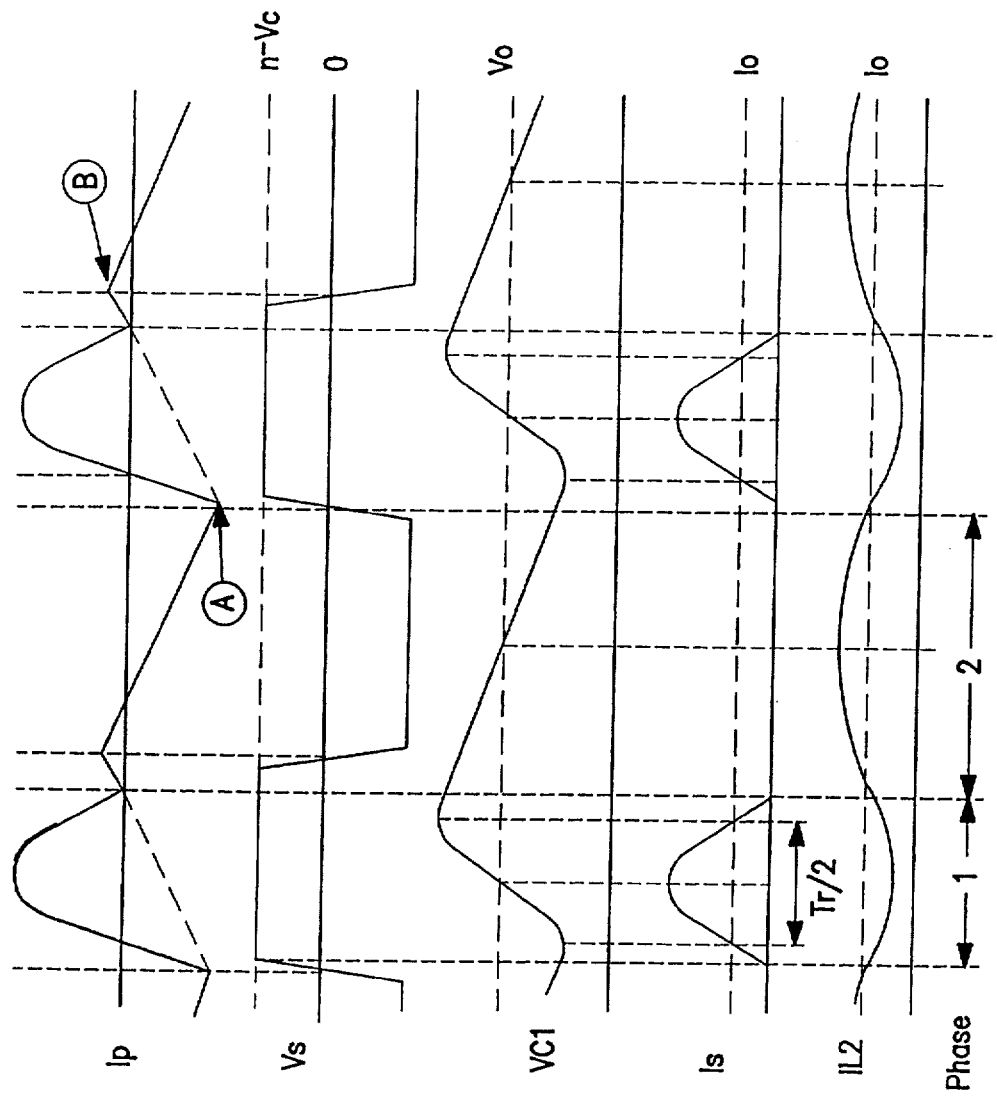

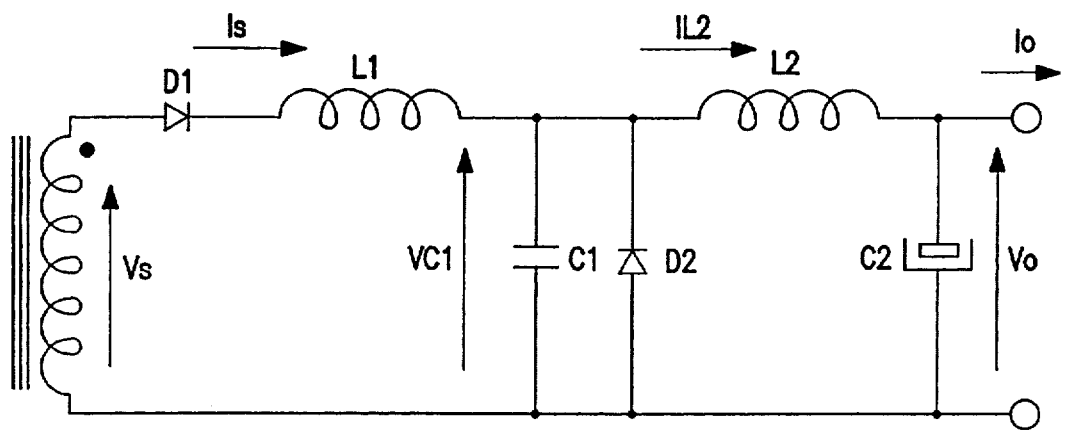
FIG. 5
PRIOR ART
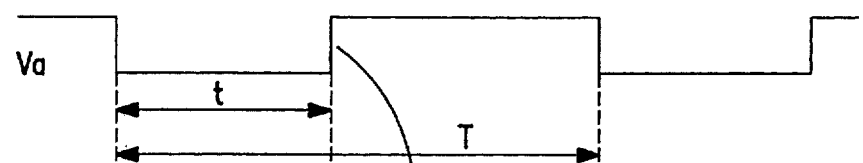
FIG. 7A  Va
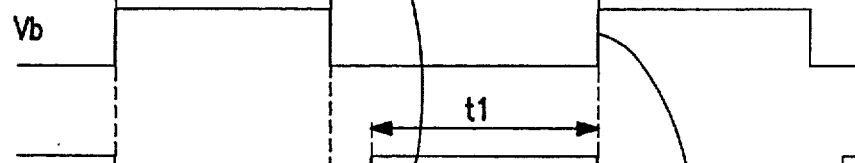
FIG. 7B  Vb
FIG. 7C  Vd
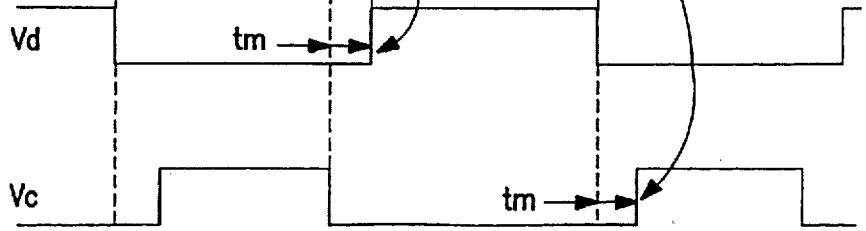
FIG. 7D  Vc